(12) United States Patent
Salunke

(10) Patent No.: US 10,323,691 B2
(45) Date of Patent: Jun. 18, 2019

(54) NEEDLE BUSH BEARING WITH SEALING DEVICE

(75) Inventor: Suresh T. Salunke, Thane (IN)

(73) Assignee: NRB Bearing Ltd., Majiwade, Thane (West), Pin (IN)

( * ) Notice: Subject to any disclaimer, the term of this patent is extended or adjusted under 35 U.S.C. 154(b) by 0 days.

(21) Appl. No.: 13/000,211

(22) PCT Filed: Jun. 19, 2009

(86) PCT No.: PCT/IN2009/000355
§ 371 (c)(1),
(2), (4) Date: Mar. 21, 2011

(87) PCT Pub. No.: WO2010/082213
PCT Pub. Date: Jul. 22, 2010

(65) Prior Publication Data
US 2011/0188793 A1    Aug. 4, 2011

(30) Foreign Application Priority Data

Jun. 20, 2008    (IN) .......................... 1298/MUM/2008

(51) Int. Cl.
| F16C 19/24 | (2006.01) |
| F16C 33/78 | (2006.01) |
| F16C 19/46 | (2006.01) |
| F16C 33/60 | (2006.01) |

(52) U.S. Cl.
CPC ........ F16C 33/7809 (2013.01); F16C 19/466 (2013.01); F16C 33/605 (2013.01)

(58) Field of Classification Search
CPC ........ F16C 19/44; F16C 19/46; F16C 19/466; F16C 33/605; F16C 33/78; F16C 33/7809; F16C 33/7823; F16C 33/7853; F16C 33/7886

USPC ................ 384/477, 481, 484, 486; 277/562, 277/565–567

See application file for complete search history.

(56) References Cited

U.S. PATENT DOCUMENTS

| 2,606,798 | A | * | 8/1952 | Hickling | ................ F16C 19/46 |
| | | | | | 384/561 |
| 3,348,889 | A | * | 10/1967 | Schaeffler et al. | ............ 384/484 |
| 3,423,140 | A | * | 1/1969 | Cowles | ......................... 384/486 |
| 3,447,848 | A | * | 6/1969 | Pitner | ............................ 384/484 |
| 3,479,100 | A | * | 11/1969 | Pitner | ............................ 384/484 |
| 3,601,457 | A | * | 8/1971 | Helms | .......................... 384/485 |

(Continued)

FOREIGN PATENT DOCUMENTS

| DE | 2144172 | 3/1973 |
| DE | 4131694 | 3/1993 |
| GB | 1252394 | 11/1971 |

*Primary Examiner* — Richard W Ridley
*Assistant Examiner* — Brian J McGovern
(74) *Attorney, Agent, or Firm* — Finnegan, Henderson, Farabow, Garrett & Dunner, LLP

(57) ABSTRACT

A needle bearing assembly includes a seal such as a double lip metal stiffener seal, and a washer within the shell. The double lip seals are accommodated within a chamber of the needle bush bearing assembly. The metal stiffener is used on a body of the double lip seal. A washer is used between one of the plane surfaces of double lip seal having a metal stiffener and the needle surface. The washer serves as a contact portion and is guided by the shell. A portion of the shell provides room to the external lip of the seal for proper placement inside the shell internal diameter.

10 Claims, 3 Drawing Sheets

(56) References Cited

U.S. PATENT DOCUMENTS

| | | | | |
|---|---|---|---|---|
| 3,924,912 | A * | 12/1975 | Pitner | 384/564 |
| 4,614,446 | A * | 9/1986 | Dreschmann et al. | 384/484 |
| 4,653,936 | A * | 3/1987 | Olschewski | F16C 19/466 |
| | | | | 277/551 |
| 4,806,026 | A * | 2/1989 | Bauer et al. | 384/486 |
| 5,303,935 | A * | 4/1994 | Saksun | 277/567 |
| 5,501,532 | A * | 3/1996 | Terrill | F16C 19/46 |
| | | | | 384/564 |
| 6,050,571 | A * | 4/2000 | Rieder et al. | 277/353 |
| 7,258,490 | B2 * | 8/2007 | Peschke et al. | 384/485 |
| 2001/0046337 | A1 * | 11/2001 | Backus et al. | 384/425 |
| 2006/0293105 | A1 * | 12/2006 | Kawakatsu | F16C 33/605 |
| | | | | 464/111 |
| 2007/0063451 | A1 * | 3/2007 | Yeager | 277/566 |
| 2008/0131044 | A1 * | 6/2008 | Bauer et al. | 384/486 |
| 2009/0154854 | A1 * | 6/2009 | Akamatsu et al. | 384/477 |

* cited by examiner

NEEDLE BUSH BEARING WITH SEALING DEVICE

FIELD OF THE INVENTION

The present invention generally relates to a needle bush bearing assembly comprising of a sealing device for inhibiting/preventing the leakage of fluid. The present invention more particularly relates to needle bearing assembly comprising of a double lip seal having stiffener and washer, within the shell of the bearing assembly. The shell is made out of special alloy steel strip.

DESCRIPTION OF THE PRIOR ART

The previously known full complement needle bearing (consisting of shell and needle) is devoid of any particular seal and at the application point spring type rotary contact type rubber seal is fitted, adjacent to the bearing. This sealing process requires additional space for the seal, which used to be fitted on the extended housing making the assembly process cumbersome.

It is known from the existing prior art that the seal, such as single lip seal is used to inhibit the flow/leakage of fluids such as lubricants from the bearing assembly. However, premature failure of the bearing used to occur due to leakage of grease, as well as due to entry of liquids such as water within the bearing assembly. Moreover, due to the fitting of seals externally, such as on the extended housing, and due to the occupancy of extra space by the sealing device, it makes the operation/handling of the assembly, including such bearing complex. Sometime, seals were disassembled from housing in field and if proper orientation of seal was not ensured during reassembly, life long lubrication could not be attended.

The study of prior art also find reference to use of double lip seals as sealing device. However, double radial lip seal has not been used effectively for sealing certain types of chambers such as needle bearing chamber because of space and if more space is allotted without changing the overall width of the bearing, it will result in reduction of load rating of bearing and hence will reduce bearing life. Moreover, since face of needle is in contact with seal part that results high wear our out of seal contact surface. Also, during rotation needles are not proper guided between two rubber seals and land for folded seal on shaft outer diameter and bore of shell is too less.

The prior art also reveals needle bearing assemblies wherein the distance between the shaft and the shell bore is at least 0.4 mm, which exposes the rubber seal to the external environment.

The problems and disadvantages associated with prior to this invention are addressed in accordance with present invention in which double lip seals with stiffeners and stainless steel washers are provided within compact width of bearing in contrast to the fitting of such seals externally such as on the extended housing.

SUMMARY OF INVENTION

The primary object of the present invention is to provide efficient and compact needle bush bearing assembly comprising of sealing means such as double lip seal within its chamber. It is the object of the invention to render effective the use of double lip seal with certain inventive structural additions and improvements. It is further object of the invention to avoid damage to the delicate lips of double lip seal due to friction with the needle surface within the chamber of the needle bearing assembly and shaft, also to protect the seal lips from getting damaged by hard foreign bodies while handling or mounting the bearings. It is further object of the invention to accommodate the double lip seals within the chamber of the needle bearing assembly to preserve grease for permanent lubrication for low friction torque.

In one embodiment of the present disclosure, as depicted in FIG. 1, a needle bearing assembly may comprise: a shell [01] having a length and a conical dish shape chamfer [06] providing room for seal folding, the chamfer [06] extending from an inner surface of said shell to an outer surface of said shell [01]; a double lip seal [11] enveloped within a bore [07] of said shell [01], a washer [05] having an inner surface facing said double lip seal [11], and a needle [02] within the shell [01]. In such an embodiment, said double lip seal [11] may include a metal stiffener [15]; said double lip seal [11] may have a length and include a central longitudinal axis and opposing surfaces that are parallel to the central longitudinal axis; said length of said shell [01] may extend along said length of said double lip seal [11], said double lip seal may include the two lips [04] and [12] extending in opposite directions and two lateral grooves [14A] and [14]; and one of said lateral grooves [14A] may be between said inner surface of said shell [01] and one of said opposing surfaces of said double lip seal [11] and said other of said lateral grooves [14] may be between another of said opposing surfaces of said double lip seal [11] and said inner surface of said washer [05]. Moreover, a single, substantially v-shaped central groove [13] may be defined by and extend inwardly between said two lips [04] and [12], said single, substantially v-shaped central groove [13] including an apex located on said central longitudinal axis. In addition, said inner surface of said shell [01] and said inner surface of said washer [05] each may have a length and be parallel to said opposing surfaces of said double lip seal [11], the length of each of said inner surfaces of said shell [01] and said washer [05] being spaced from said double lip seal [11]. Furthermore, each of said lips [04] and [12] may have outermost ends each configured to fold into a corresponding one of said lateral grooves [14A] and [14], one of said lips [04] being positioned adjacent to the inner surface of said shell [01] corresponding to said chamfer [06] and the other of said lips [12] being positioned adjacent to the inner surface of said washer [05]. The washer [05] may be placed between said double lip seal [11] and the needle [02] and said metal stiffener [15] may be mounted on a side of the double lip seal [11] adjacent to the washer [05]. In such an embodiment, said at least one of said lateral grooves [14A] and [14] may be inclined at an angle with reference to the face [09] of said needle [02]. Additionally or alternatively, said lateral grooves [14A] and [14] may be within the shell [01].

In one embodiment of the present disclosure, as depicted in FIGS. 1 and 2, a needle bearing assembly may comprise a shell [01] having a length and a conical dish shape chamfer [06] providing room for seal folding, the chamfer [06] extending from an inner surface of said shell [01] to an outer surface of said shell [01]; a plurality of double lip seals enveloped within a bore [07] of said shell [01], each double lip seal [11] of said double lip seals including a corresponding metal stiffener [15]; a washer [05] having an inner surface facing one of said double lip seals [11]; and a plurality of needles [02] within the shell [01]. In such an embodiment, each double lip seal [11] of said double lip seals may have a corresponding length, a corresponding central longitudinal axis and corresponding opposing surfaces, and said length of said shell [01] may extend along said lengths of said double lip seals. Moreover, each double lip seal [11] may include the respective two lips [04] and [12] of each seal [11] extending in opposite directions and two respective lateral grooves [14A] and [14], one of said lateral grooves [14A] of the one of said double lip seals [11] being between said inner surface of said shell [01] and one of said opposing surfaces of the one of said double lip seals [11] and said other of said lateral grooves [14] of the one of said double lip seals being between the another of said opposing surfaces of the one of said double lip seals [11] and said inner surface of said washer [05]. In addition, a single, v-shaped central groove [13] may be defined by and extend between said respective two lips [04] and [12] of the one of said double lip seals [11], said single, v-shaped central groove [13] having an apex located on said central longitudinal axis of the one of said double lip seals [11]. Furthermore, said inner surface of said shell [01] and said inner surface of said washer [05] may be parallel to said opposing surfaces of the one of said double lip seals [11], each of said respective lips [04] and [12] of each of said double lip seals [11] including outermost ends configured to fold into a corresponding one of said lateral grooves [14A] and [14], and one of said respective lips [04] of the one of said double lip seals [11] being positioned adjacent to the inner surface of said shell [01] and the other of said respective lips [12] of the one of said double lip seals [11] being positioned adjacent to the inner surface of said washer [05]. In such an embodiment, said lateral grooves [14A] and [14] of each double lip seal may be inclined at an angle with reference to the face [09] of said needles [02]. Additionally or alternatively, said lateral grooves [14A] and [14] may be within the shell [01].

As per one of the preferred embodiments of the present invention, stiffener is used on the body of double lip seal. As per another preferred embodiment, the present invention also provides a washer between one of the plane surfaces of double lip seal having metal stiffener and the needle surface. Another embodiment of the present invention provides at least two lips wherein one external lip prevents entry of foreign particle and pollutants into the bearing assembly and the other internal lip adjacent to washer prevents leakage of fluids/semi fluids such as but not limited to grease, accumulated in the space between two washers, shell internal diameter and needles. The washers serve as contact portion and are guided by the shell. The portion of the shell gives room to the external lip of the seal for proper sitting inside shell flange internal diameter, in the form of chamfer. In another preferred embodiment, the trail gap between the shaft and the shell bore is kept up to 0.1 mm.

DESCRIPTION OF THE DRAWINGS

The present invention will be described with reference to the drawings accompanying the provisional specification wherein.

DETAILED DESCRIPTION OF THE INVENTION

Figure 1:
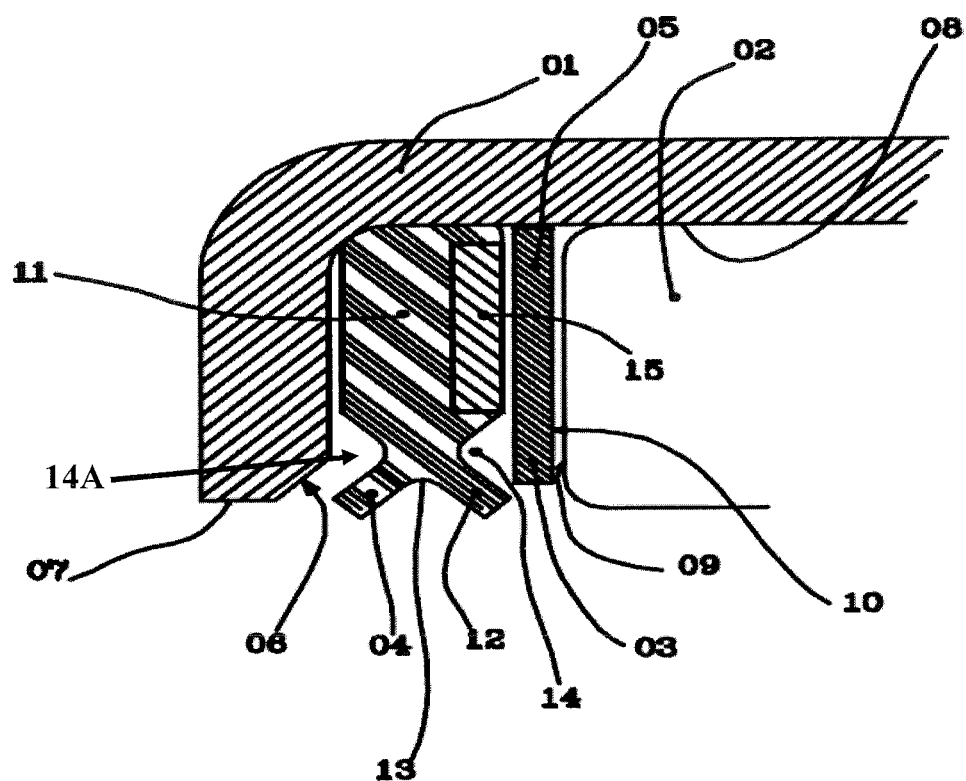
FIG. 1 shows the cross-sectional view of the embodiment of the present invention.
Figure 2:
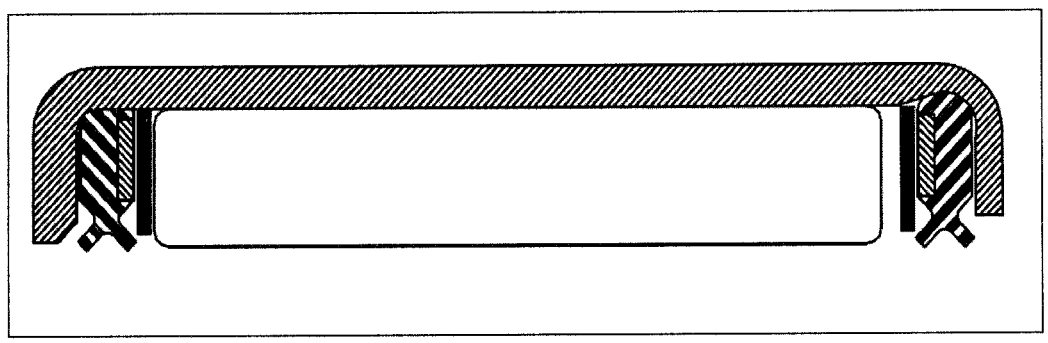
FIG. 2 shows the schematic cross-sectional view of the embodiment of the present invention.
Figure 3:
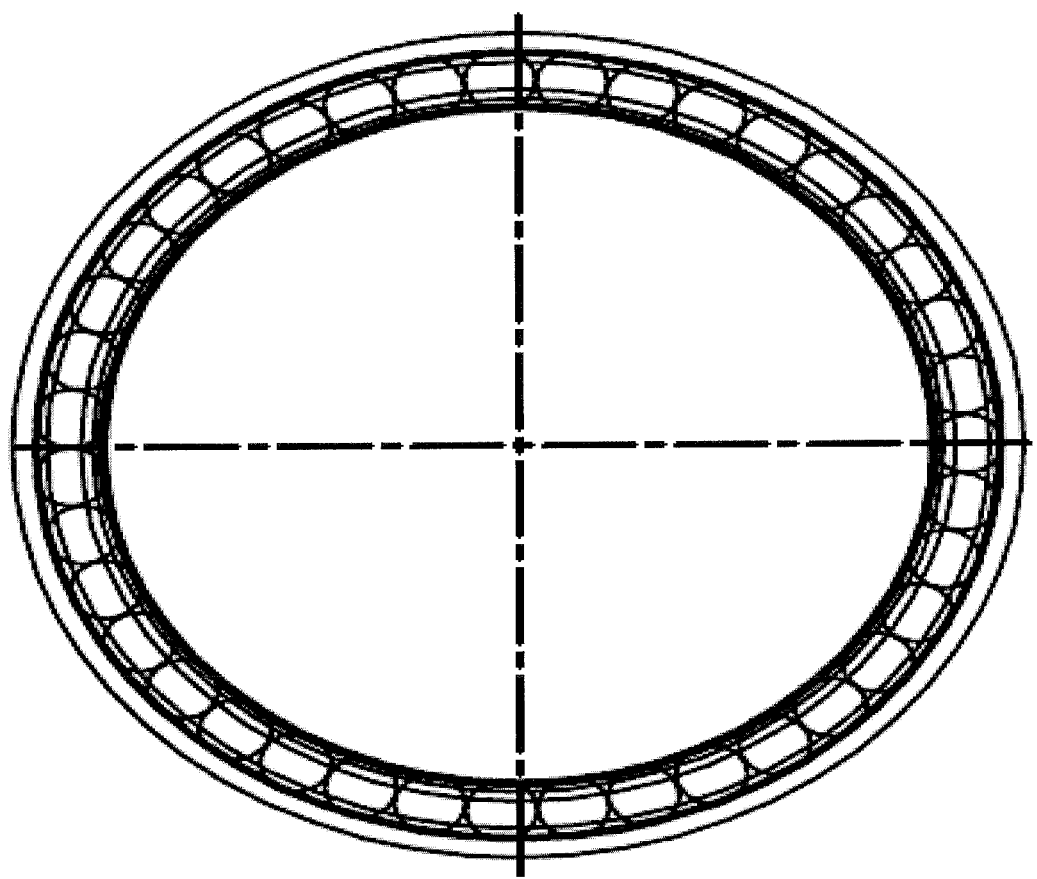
FIG. 3 is the top/plan view of the embodiment of the present invention.

With reference to FIGS. 1, 2, and 3, the needle bearing assembly consisting of sealing device such as double lip seal will be discussed in detail as follows.

The needle bearing assembly contains shell [01] made up of special alloy steel material and annular cylindrical deep drawn part with close rim at both end to hold seals, washers and needles. In the bearing assembly, shell [01] acts as external enveloping portion of the bearing and holds rolling elements and guides those during rotation and acts as means to take the load. The shell [01] contains conical dish shape chamfer [06] to provide room for seal folding. The shell bore [07] envelops the elements of the bearing assembly and protects them including double lip seal from the external factors. Further, the trail gap between the shaft and the shell bore is kept up to 0.1 mm which minimizes the exposure of the inside rubber seal to the external factors like air. The portion of the shell internal diameter [08] guides the needles [02] and washers [05]. In case of the needles [02] the faces [09] are not in direct contact with the rubber seals. However, in accordance with the present invention separate stainless steel washers [05] act as intermediate contact portion for reducing direct friction with the faces of the needles [09]. As per one of the preferred embodiment of present invention the washer portion [03]/[05] acts as guiding face of all needles at both ends and ensure smooth rotation therein. The portion [05] is closely guided by shell ID [08] to position and align to the bearing axis. The portion [06] provides necessary room to the external lip [04] of the seal for appropriate sitting. The washer is made up of corrosive resistance steel material, which is immune from adverse impact of chemical substances such as grease and the external pollutants.

As per the present invention the rubber seal [11] is made up of mass of resilient material having outer and inner sealing lips [04] and [12]. As shown in FIG. 2, the rubber seal [11] is arrange so that a length of the shell [01] extends along the length of the rubber seal [11]. The rubber seal [11] has low carbon steel metal stiffener [15] on at least one side. The rubber seal [11] may be produced by molding, wherein a separate washer is attached to the seal so as to have a simultaneous bonding of resilient material to the said washer. Lip [04] of the seal [11] adjacent to shell grove [06] prevents entry of foreign material including pollutants into the needle bearing assembly. The hp [04] is arranged in the assembly in such a manner that it can get folded inside the shell grove [06] within the assembly. The lip [12] of the seal adjacent to washer portion [14] is arranged in such a manner that it can prevent leakage of any substance such as grease, accumulated between two washers [03] at both sides of the needle faces, shell and the needles. The internal lip of the seal [11] is positioned within the assembly in such a manner that it can get folded within the assembly inside bore of washer [03]. The seal. [11] has rigidity and stiffness due to metal stiffener [15]. The washer portion [03]/[05] is in contact with stiffener [15].

As per the present invention V-shape gap [13] is provided, which creates room to facilitate retention of lubrication and also prevents entry of foreign material such as pollutants because of space provided therein. The seal [11] has groove [14]/[14A] in inward/outward annular direction which provides room for lip folding as well as stretching and folding over bearing shaft below washer [03].

This entire arrangement permits the escape of any excess lubricant or grease from bearing assembly while assembling bearing on shaft and excess grease floating below the level of shaft outer diameter.

The embodiments of the invention described, referred hereinabove are calculated to overcome the hurdles and achieve benefits, and advantages as hereinabove set forth. It may be possible to further modify and improve the described invention within the scope of the unity of the present invention.

The invention claimed is:

1. A needle bearing assembly comprising:
a shell having a length and a conical dish shape chamfer providing room for seal folding, the chamfer extending from an inner surface of said shell towards an axial exterior of said shell;
a double lip seal enveloped within a bore of said shell,
a washer having an inner surface facing said double lip seal,
said double lip seal including a metal stiffener,
said double lip seal having a length and including a central longitudinal axis and opposing surfaces that are parallel to the central longitudinal axis,
said length of said shell extending along said length of said double lip seal, said double lip seal including the two lips extending in opposite directions and two lateral grooves,
one of said lateral grooves being between said inner surface of said shell and one of said opposing surfaces of said double lip seal and said other of said lateral grooves being between another of said opposing surfaces of said double lip seal and said inner surface of said washer,
a single, substantially v-shaped central groove defined by and extending inwardly between said two lips,
said single, substantially v-shaped central groove including an apex located on said central longitudinal axis,
said inner surface of said shell and said inner surface of said washer each having a length and being parallel to said opposing surfaces of said double lip seal,
the length of each of said inner surfaces of said shell and said washer being spaced from said double lip seal,
each of said lips having a respective outermost end each configured to fold into a respective one of said lateral grooves, one of said lips being positioned adjacent to the inner surface of said shell and corresponding to said chamfer, and the other of said lips being positioned adjacent to the inner surface of said washer; and
a needle within the shell,
wherein the washer is placed between said double lip seal and the needle and said metal stiffener is mounted on a side of the double lip seal adjacent to the washer.

2. The needle bearing assembly as claimed in claim 1, wherein said washer is adjacent to said seal and configured to guide a face of the needle.

3. The needle bearing assembly as claimed in claim 1, wherein at least one of said lateral grooves is formed in said double lip seal in an inward annular direction to provide room for lip folding.

4. The needle bearing assembly as claimed in claim 1, wherein at least one of said lateral grooves is formed in said double lip seal in an outward annular direction to provide room for lip folding.

5. The needle bearing assembly as claimed in claim 4, wherein said at least one of said lateral grooves is inclined at an angle with reference to a face of said needle.

6. The needle bearing assembly as claimed in claim 1, wherein said washer is of stainless steel.

7. The needle bearing assembly as claimed in claim 1, wherein said double lip seal is prepared by molding the double lip seal with the metal stiffener for simultaneous bonding of resilient material.

8. The needle bearing assembly as claimed in claim 7, wherein said lateral grooves are within the shell.

9. The needle bearing assembly as claimed in claim 1, wherein said lateral grooves are within the shell.

10. A needle bearing assembly comprising:
a shell having a length and a conical dish shape chamfer providing room for seal folding, the chamfer extending from an inner surface of said shell towards an axial exterior of said shell;
a plurality of double lip seals enveloped within a bore of said shell,
each double lip seal of said double lip seals including a respective metal stiffener,
a washer having an inner surface facing one of said double lip seals,
each double lip seal of said double lip seals having a respective length, a respective central longitudinal axis and respective opposing surfaces,
said length of said shell extending along said respective lengths of said double lip seals,
each double lip seal including the respective two lips of each seal extending in respective opposite directions and a respective two lateral grooves,
one of the respective two lateral grooves of the one of said double lip seals being between said inner surface of said shell and one of said respective opposing surfaces of the one of said double lip seals and the other of said respective two lateral grooves of the one of said double lip seals being between another of said respective opposing surfaces of the one of said double lip seals and said inner surface of said washer,
a single, v-shaped central groove defined by and extending between said respective two lips of the one of said double lip seals,
said single, v-shaped central groove having an apex located on said respective central longitudinal axis of the one of said double lip seals,
said inner surface of said shell and said inner surface of said washer being parallel to said respective opposing surfaces of the one of said double lip seals,
each of said respective lips of each of said double lip seals including a respective outermost end configured to fold into a respective one of said respective two lateral grooves,
one of the two respective lips of the one of said double lip seals being positioned adjacent to the inner surface of said shell and the other of said respective lips of the one of said double lip seals being positioned adjacent to the inner surface of said washer; and
a plurality of needles within the shell.

* * * * *